United States Patent
Yasuda et al.

(10) Patent No.: US 8,423,190 B1
(45) Date of Patent: Apr. 16, 2013

(54) MANIPULATOR SYSTEM

(75) Inventors: Ken'ichi Yasuda, Kitakyushu (JP); Takahiro Maeda, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 269 days.

(21) Appl. No.: 12/786,384

(22) Filed: May 24, 2010

Related U.S. Application Data

(60) Provisional application No. 61/186,369, filed on Jun. 11, 2009.

(51) Int. Cl.
*G05B 15/00* (2006.01)

(52) U.S. Cl.
USPC ............ 700/263; 700/248; 700/254; 180/8.1; 318/562

(58) Field of Classification Search ................... 700/165, 700/248, 251, 254, 262; 33/503; 606/1; 378/209; 318/568.2; 702/152; 180/8.1
See application file for complete search history.

(56) References Cited

U.S. PATENT DOCUMENTS

| | | | | |
|---|---|---|---|---|
| 4,260,941 A | * | 4/1981 | Engelberger et al. ...... | 318/568.2 |
| 5,737,500 A | * | 4/1998 | Seraji et al. ................... | 700/251 |
| 6,341,243 B1 | * | 1/2002 | Bourne et al. ................. | 700/165 |
| 6,965,843 B2 | * | 11/2005 | Raab et al. ..................... | 702/152 |
| 7,717,904 B2 | * | 5/2010 | Suzuki et al. ..................... | 606/1 |
| 8,005,571 B2 | * | 8/2011 | Sutherland et al. ........... | 700/248 |
| 2002/0120363 A1 | * | 8/2002 | Salisbury et al. ............. | 700/254 |
| 2005/0016778 A1 | * | 1/2005 | Kitano et al. ................... | 180/8.1 |
| 2005/0166413 A1 | * | 8/2005 | Crampton ....................... | 33/503 |
| 2009/0003532 A1 | * | 1/2009 | Weber ............................ | 378/209 |
| 2010/0152899 A1 | * | 6/2010 | Chang et al. .................. | 700/262 |
| 2011/0071677 A1 | * | 3/2011 | Stilman ......................... | 700/254 |

FOREIGN PATENT DOCUMENTS

JP 05-285863 11/1993

* cited by examiner

*Primary Examiner* — Tuan C. To
*Assistant Examiner* — Yuri Kan
(74) *Attorney, Agent, or Firm* — Ditthavong Mori & Steiner, P.C.

(57) ABSTRACT

From a desired wrist joint position and a desired elbow rotation angle, a temporary elbow joint position is calculated on the assumption that a distance between a shoulder joint and an elbow joint is fixed. The shoulder joint has a first axis, a second axis, and a third axis, and the elbow joint has a fourth axis. From the calculated temporary elbow joint position, temporary angles of the first and second axes or temporary angles of the first to fourth axes are determined. The temporary angles are corrected in accordance with at least one evaluation function calculated from the temporary angles.

6 Claims, 4 Drawing Sheets

MANIPULATOR SYSTEM

CROSS-REFERENCES TO RELATED APPLICATION

The present application claims priority to U.S. Provisional Application No. 61/186,369, which was filed on Jun. 11, 2009. The contents of the application is incorporated herein by reference in their entirety.

BACKGROUND OF THE INVENTION

1. Field of the Invention

The present invention relates to robotic manipulator control systems.

2. Discussion of the Background

As a method for controlling an operation of a manipulator having seven degrees of freedom, Japanese Unexamined Patent Application Publication No. 5-285863 discloses a control method which involves solving an equation (1) using a pseudo inverse matrix $J^+$ of a Jacobian matrix (six-row by seven-column matrix).

SUMMARY OF THE INVENTION

According to one aspect of the present invention, a manipulator system includes a shoulder joint having a first axis, a second axis, and a third axis; a wrist joint having a fifth axis, a sixth axis, and a seventh axis; an elbow joint having a fourth axis; an upper-arm link connected to the shoulder joint and the elbow joint; and a lower-arm link connected to the elbow joint and the wrist joint. An intersection of the first axis of the shoulder joint and a straight line orthogonal to the first and second axes of the shoulder joint is defined as a shoulder reference point. A point at which the three axes of the wrist joint intersect is defined as a wrist reference point. A coordinate origin of the fourth axis of the elbow joint is defined as an elbow reference point. From a desired wrist reference point position and a desired elbow rotation angle, a temporary elbow position is calculated on the assumption that a distance between the shoulder reference point and the elbow reference point is fixed. Temporary angles of at least the first and second axes are determined from the temporary elbow position. The temporary angles are corrected in accordance with at least one evaluation function calculated from the temporary angles.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
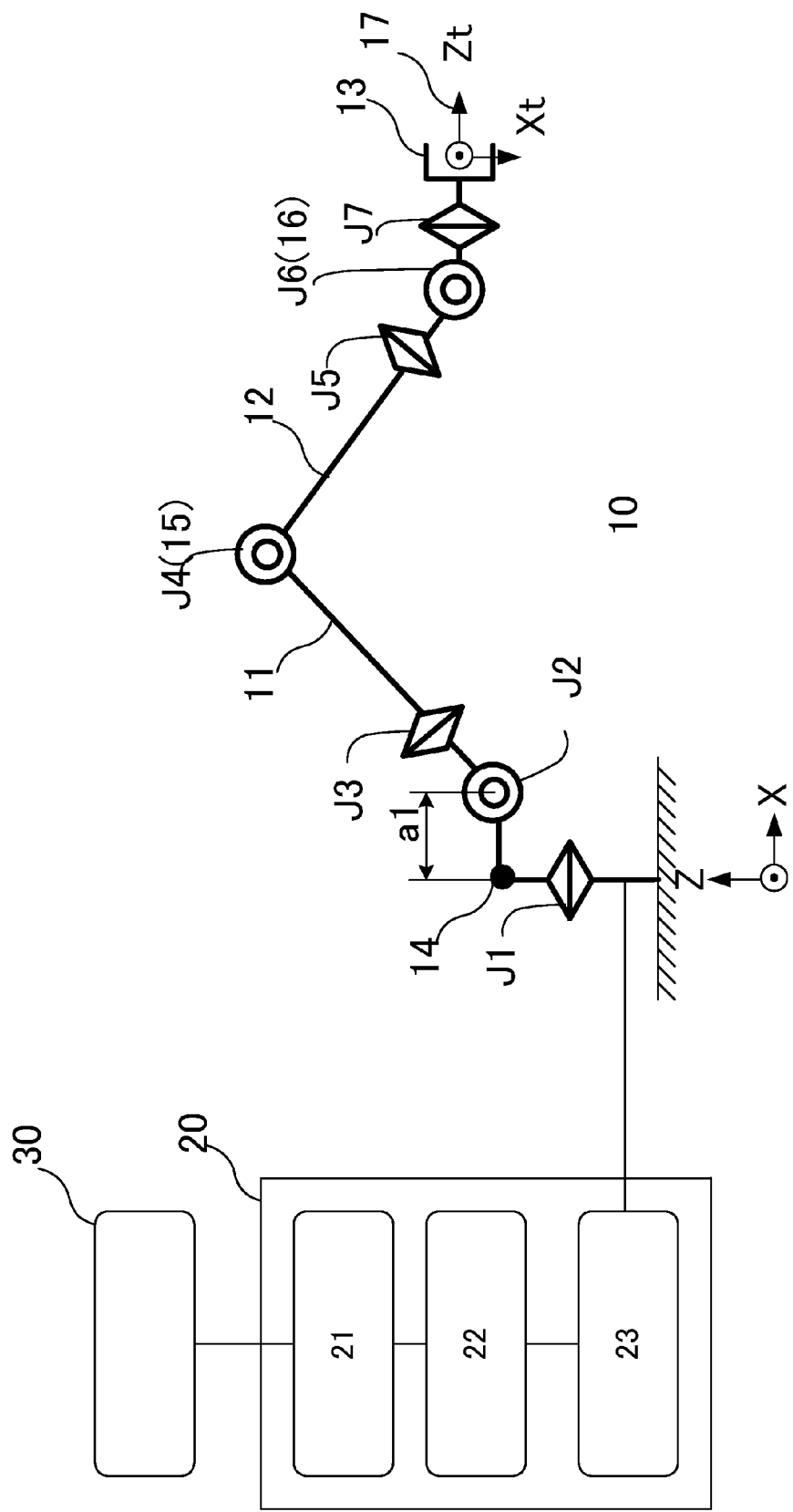
FIG. 1 illustrates a configuration of a seven-degree-of-freedom manipulator according to a first embodiment of the present invention.

Embodiments of the present invention will now be described with reference to the accompanying drawings, wherein like reference numerals designate corresponding or identical elements throughout the various drawings.

FIG. 1 illustrates a configuration of a seven-degree-of-freedom manipulator 10 according to a first embodiment of the present invention. As illustrated, the seven-degree-of-freedom manipulator 10 includes a shoulder joint having a J1 axis, a J2 axis, and a J3 axis; an elbow joint having a J4 axis; and a wrist joint having a J5 axis, a J6 axis, and a J7 axis. The seven-degree-of-freedom manipulator 10 further includes an upper-arm link 11 connected to the shoulder joint and the elbow joint, and a lower-arm link 12 connected to the elbow joint and the wrist joint. Additionally, an end effector 13 is attached to the wrist joint. A frame denoted by reference numeral 17 indicates a desired hand position/attitude (hereinafter referred to as a desired hand position/attitude 17). Although three rotation axes, the J5 to J7 axes, of the wrist joint intersect at one point, there is an offset a1 in the X direction between the J1 and J2 axes of the shoulder joint.

An intersection of the J1 axis of the shoulder joint and a straight line orthogonal to the J1 and J2 axes of the shoulder joint is defined as a shoulder reference point 14. A coordinate origin of the J4 axis of the elbow joint is defined as an elbow reference point 15. An intersection of three axes, the J5 to J7 axes, of the wrist joint is defined as a wrist reference point 16. A plane that passes through the shoulder reference point 14, the elbow reference point 15, and the wrist reference point 16 is defined as an "elbow plane".

A control method of the present embodiment is implemented in a command generating unit 21 in a controller 20 of the seven-degree-of-freedom manipulator 10. A joint angle of each axis is calculated from the desired hand position/attitude 17 and a desired elbow rotation angle. A motor for each axis is controlled by a servo unit 22 through position/speed feedback control. In a jogging operation in teach mode, the increments of a hand position/attitude and an elbow rotation angle are set with buttons on a programming pendant 30. The desired hand position/attitude 17 and the desired elbow rotation angle are thus determined.

In the present embodiment, a plane that passes through the three points, the shoulder reference point 14, the elbow reference point 15, and the wrist reference point 16, in a manipulator attitude that realizes the desired hand position/attitude 17 when the J3 axis has an angle θ3=0 is defined as a reference elbow plane. This manipulator attitude is defined as an elbow rotation angle=0.

Figure 2:
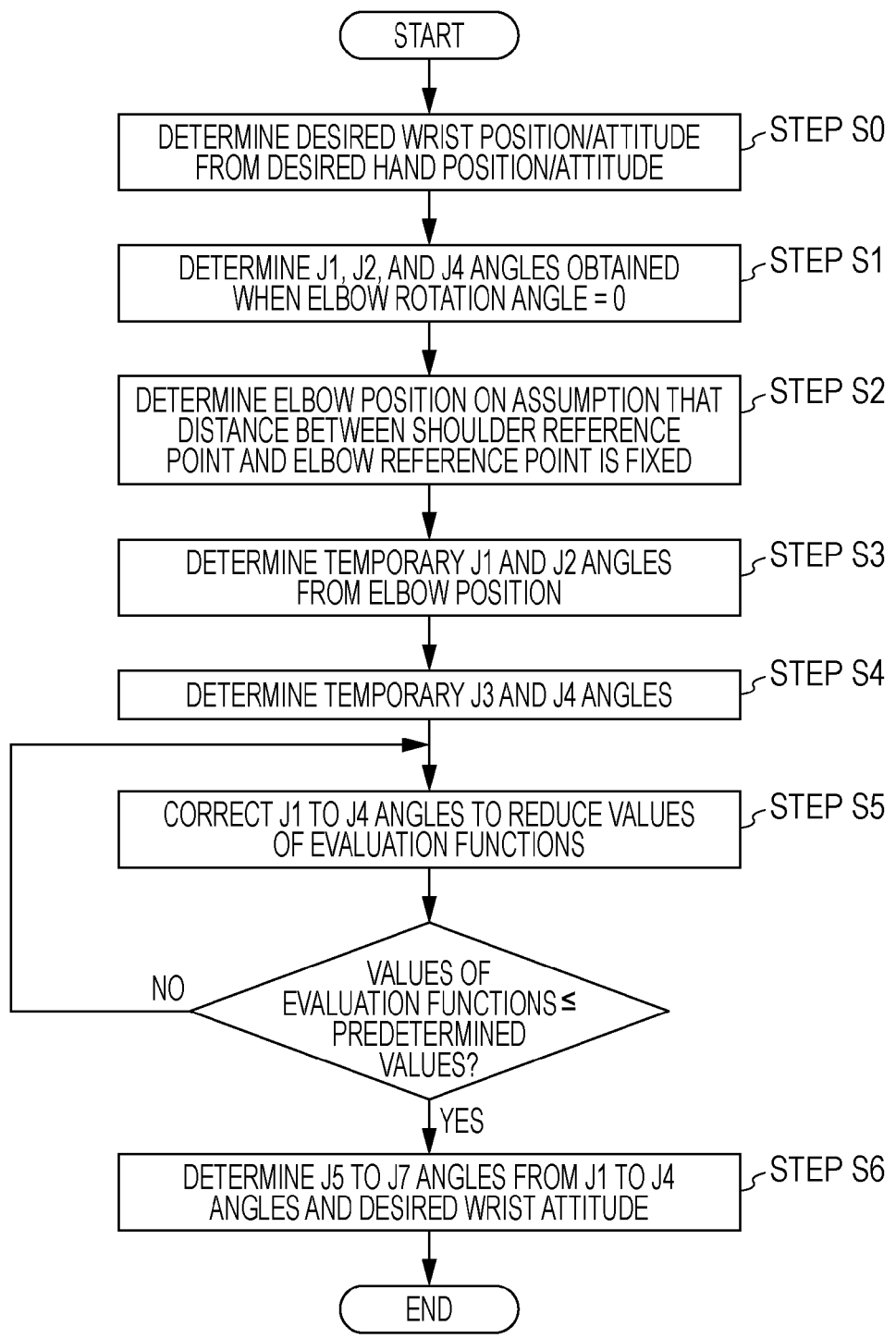
FIG. 2 is a flowchart according to the first embodiment.

FIG. 2 is a flowchart illustrating a procedure of inverse-kinematic calculation that calculates a joint angle of each axis from the desired hand position/attitude 17 and the desired elbow rotation angle in the seven-degree-of-freedom manipulator 10 illustrated in FIG. 1.

In step S0, a desired wrist position/attitude is determined from the desired hand position/attitude 17. This can be easily determined from dimensions of the end effector 13 if the three axes of the wrist joint intersect at one point.

In step S1, angles of the J1 axis, the J2 axis, and the J4 axis, the angles being obtained when the elbow rotation angle=0 or the angle of the J3 axis θ3=0, are determined.

In step S2, a position of the elbow reference point 15 that realizes a desired elbow angle is calculated. If the offset a1=0, the seven-degree-of-freedom manipulator 10 can rotate to allow the elbow reference point 15 to draw a clear circle about a straight line that connects the shoulder reference point 14 to the wrist reference point 16. However, if the offset a1≠0, the circle may not be a clear one, since a distance between the shoulder reference point 14 and the elbow reference point 15 is variable. Here, however, a temporary position of the elbow reference point 15 is first determined on the assumption that the distance between the shoulder reference point 14 and the elbow reference point 15 is fixed. An elbow position vector $O_4$ can be determined by Equation 1 below:

$$O_4 = O_4' \cos\theta_e + \sin\theta_e(K_a \times O_4') + (1-\cos\theta_e)(K_a \cdot O_4')K_a \quad \text{Equation 1}$$

where $O_4'$ is a vector from the shoulder reference point 14 to the elbow reference point 15 obtained when the elbow rotation angle=0, $\theta_e$ is a desired elbow angle, and $K_a$ is a vector from the shoulder reference point 14 to the wrist reference point 16.

In step S3, angles of the J1 and J2 axes that realize the elbow reference point 15 are determined. The elbow reference point 15 is determined in step S2 on the assumption that the distance between the shoulder reference point 14 and the elbow reference point 15 is fixed. Therefore, the angles of the J1 and J2 axes to be determined here are temporary angles, not final command angles.

$$\theta_{1\_tmp} = a\tan 2(\pm O_{4y}, \pm O_{4z}) \quad \text{Equation 2}$$

$$\theta_{2\_tmp} = a\tan 2(\pm\sqrt{O_{4x}^2 + O_{4y}^2} - a1, O_{4z}) \quad \text{Equation 3}$$

In step S4, angles of the J3 and J4 axes are determined from the desired wrist position and the above-determined temporary angles of the J1 and J2 axes. Again, since the angles of the J1 and J2 axes are temporary angles, the angles of the J3 and J4 axes are temporary angles, not final command angles.

In step S5, the above-determined temporary angles of the J1 to J4 axes are corrected. For the correction, the following two evaluation functions, d1 and d2, calculated from these temporary angles are used:

$$d1 = \sqrt{(x_{pd} - x_{p\_tmp})^2 + (y_{pd} - y_{p\_tmp})^2 + (z_{pd} - z_{p\_tmp})^2} \quad \text{Equation 4}$$

$$d2 = \theta_{ed} - \theta_{e\_tmp} \quad \text{Equation 5}$$

where $(x_{pd}, y_{pd}, z_{pd})$ is a desired wrist position, $(x_{p\_tmp}, y_{p\_tmp}, z_{p\_tmp})$ is a wrist position calculated from the temporary angles by forward-kinematic calculation, $\theta_{ed}$ is a desired elbow rotation angle, and $\theta_{e\_tmp}$ is a wrist an elbow rotation angle calculated from the temporary angles.

The temporary angles of the J1 to J4 axes are corrected to reduce the values of d1 and d2. Specifically, a Jacobian matrix representing a micro-displacement relation is used as follows to correct the temporary angles:

$$\begin{pmatrix} \Delta\theta_1 \\ \Delta\theta_2 \\ \Delta\theta_3 \\ \Delta\theta_4 \end{pmatrix} = J^{-1} \begin{pmatrix} \Delta x \\ \Delta y \\ \Delta z \\ \Delta E \end{pmatrix} \quad \text{Equation 6}$$

where $\Delta\theta_1$ to $\Delta\theta_4$ are the amounts of correction of the J1 to J4 axes, $\Delta x$ to $\Delta z$ are differences in wrist position calculated from the desired wrist position and the temporary angles, and $\Delta E$ is a difference in elbow rotation angle calculated from the desired elbow rotation angle and the temporary angles. A Jacobian matrix J is calculated on the basis of the temporary angles of the J1 to J4 axes. The amounts of correction of the J1 to J4 axes can be determined by calculating an inverse matrix of the Jacobian matrix J.

Then, angles obtained by adding the amounts of correction to their corresponding temporary angles are determined to be new temporary angles. By using the new temporary angles, the values d1 and d2 of the evaluation functions of Equations 4 and 5 are calculated. If d1 and d2 do not exceed their corresponding predetermined values, the current temporary angles are determined to be final command angles, and step S5 ends. If d1 and d2 are greater than their corresponding predetermined values, new temporary angles are used to determine the amounts of correction of the J1 to J4 axes by Equation 6 again. Thus, by repeating the calculation of the evaluation functions until a certain level of precision is reached, precise command angles of the J1 to J4 axes can be ultimately obtained.

Last, in step S6, command angles of J5 to J7 axes are determined from the desired wrist attitude and the command angles of the J1 to J4 axes calculated in step S5.

In the first embodiment described above, a Jacobian matrix is used to repeatedly calculate the angles of the J1 to J4 axes until a predetermined level of precision is reached. Besides the Jacobian matrix, a convergence calculation technique, such as typical linear programming, may be used for the calculation.

Figure 3:
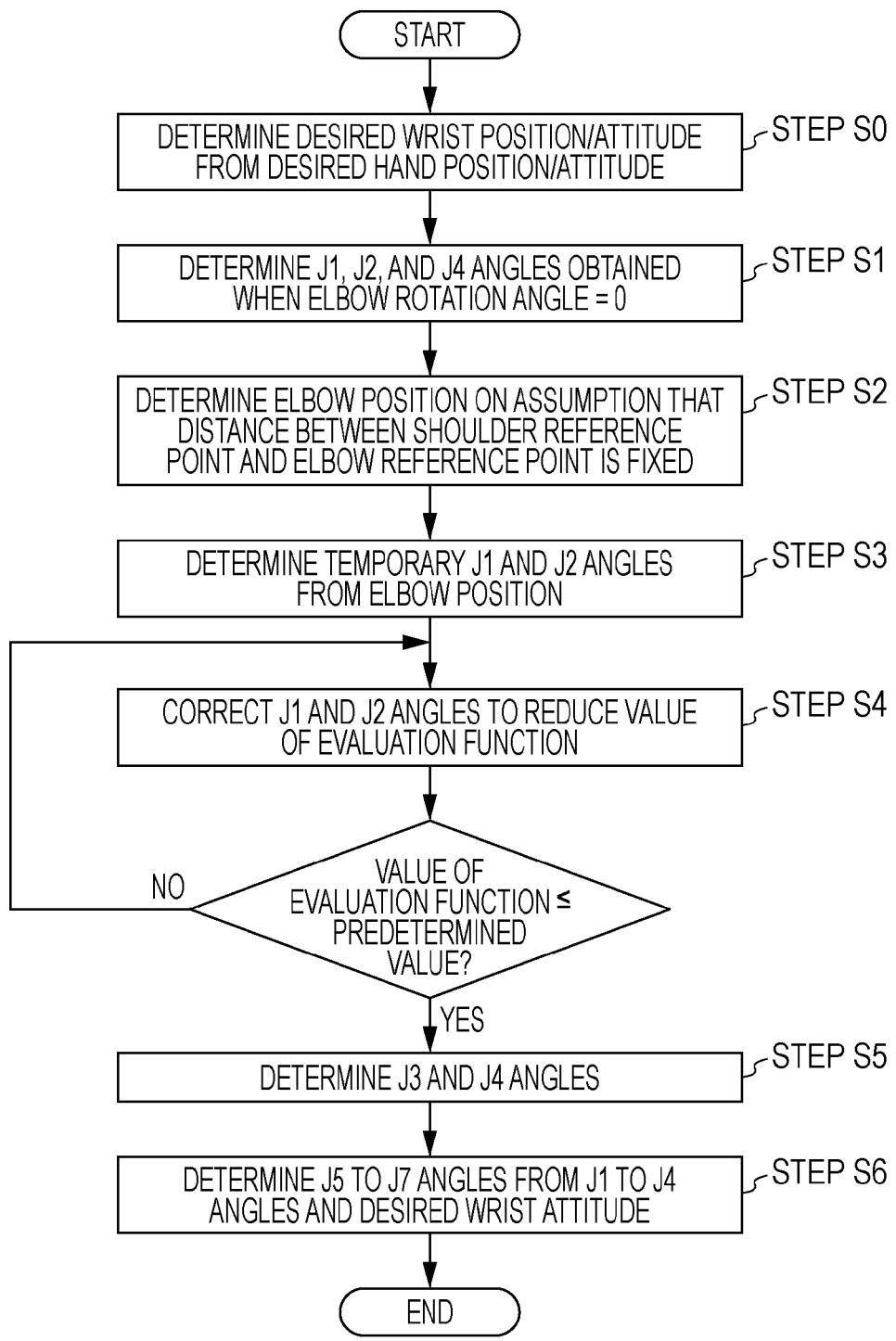
FIG. 3 is a flowchart according to a second embodiment of the present invention.

FIG. 3 is a flowchart illustrating a procedure according to a second embodiment of the present invention.

Step S0 to step S3 of FIG. 3 are the same as those of FIG. 2 of the first embodiment.

In step S4, the temporary angles of the J1 and J2 axes, the temporary angles being determined in step S3, are corrected using the following evaluation function d3 calculated from these temporary angles:

$$d3 = \sqrt{(P_{x0} - P_{x1})^2 + (P_{y0} - P_{y1})^2 + (P_{z0} - P_{z1})^2} \quad \text{Equation 7}$$

where $(P_{x0}, P_{y0}, P_{z0})$ is a direction cosine of a plane that passes through three points, i.e., the elbow reference point 15 determined in step S2 on the assumption that the distance between the shoulder reference point 14 and the elbow reference point 15 is fixed, the shoulder reference point 14, and the desired wrist position; and $(P_{x1}, P_{y1}, P_{z1})$ is a direction cosine of a plane that passes through three points, i.e., the elbow reference point 15 calculated from the temporary angles determined in step S3, the shoulder reference point 14, and the desired wrist position.

The temporary angles of the J1 and J2 axes are corrected to reduce the value of d3. Specifically, by an angle between the two direction cosines described above, the elbow reference point 15 is rotated in accordance with Equation 1. On the basis of the position of the rotated elbow reference point 15, the angles of the J1 and J2 axes are determined. The determined angles of the J1 and J2 axes are determined to be new temporary angles. By using the new temporary angles, the value d3 of the evaluation function of Equation 7 is calculated. If d3 does not exceed a predetermined value, the current temporary angles are determined to be final command angles, and step S4 ends. If d3 is greater than the predetermined value, new temporary angles are used to determine appropriate correction angles again. Thus, by repeating the calculation of the evaluation function until a certain level of precision is reached, precise command angles of the J1 and J2 axes can be ultimately obtained.

In step S5, angles of the J3 and J4 axes are determined from the desired wrist position and the above-determined command angles of the J1 and J2 axes.

Last, in step S6, as in the case of the first embodiment, command angles of the J5 to J7 axes of the wrist joint are determined from the desired wrist attitude and the above-calculated command angles of the J1 to J4 axes.

The evaluation function is not limited to those described in the first and second embodiments, and various types of evaluation functions can be used.

As described above, on the basis of the elbow reference point position calculated on the assumption that the distance between the shoulder reference point 14 and the elbow reference point 15 is fixed, temporary angles of the J1 and J2 axes or the J1 to J4 axes are determined. The temporary angles are corrected in accordance with at least one evaluation function. Thus, repeating the calculation of the evaluation function improves precision of the resulting angles. With this process, even if there is an offset in the shoulder joint, it is possible to precisely perform, by using inverse-kinematic calculation, orthogonal operation control based on the desired wrist position/attitude and the desired elbow rotation angle.

In the first and second embodiments described above, there is an offset in the X direction between the J1 and J2 axes, as illustrated in FIG. 1. However, the position of the offset and the axis configuration of the shoulder joint are not limited to those described above. The present invention is applicable to seven-degree-of-freedom manipulators of various axis configurations.

Figure 4:
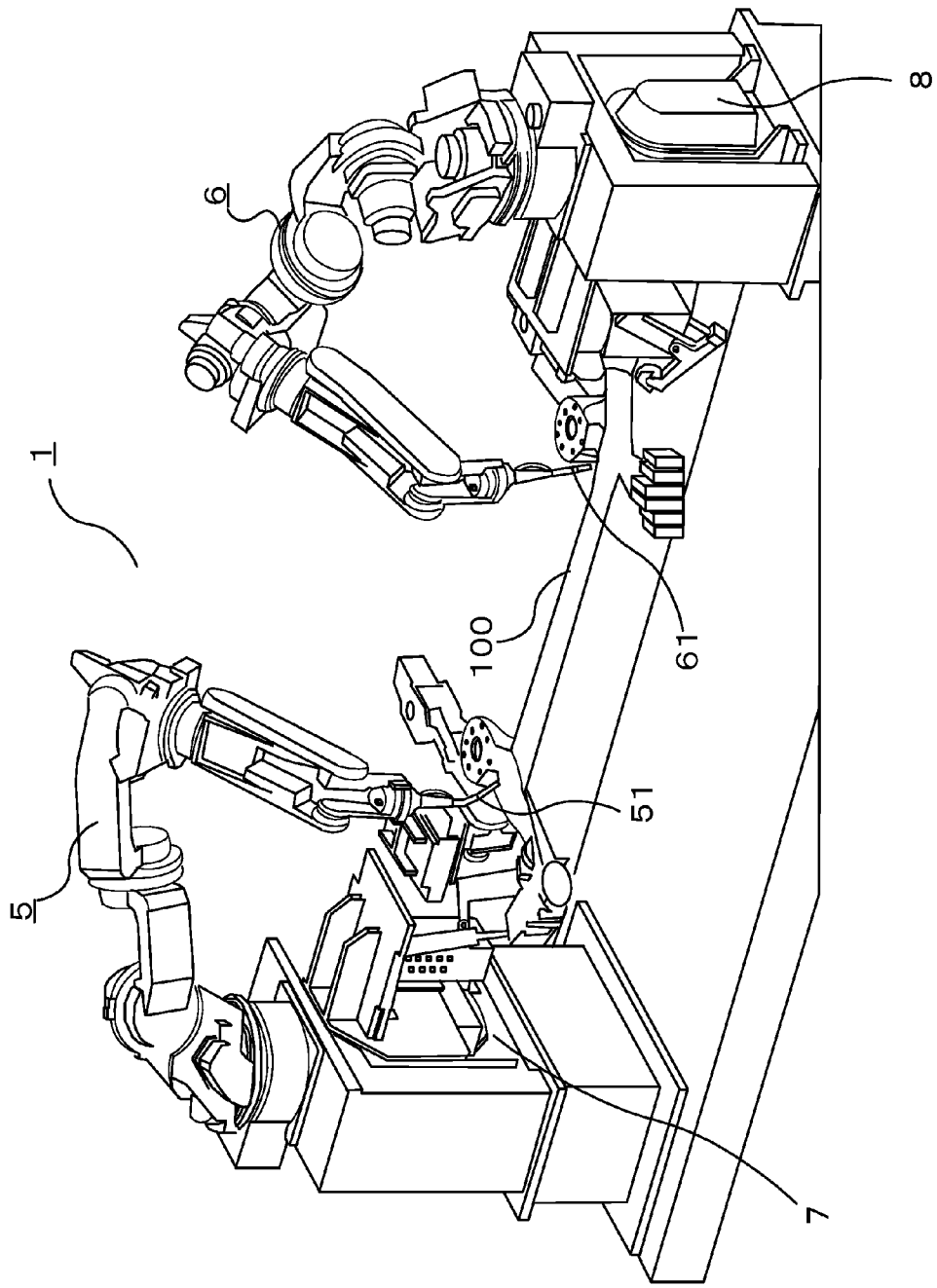
FIG. 4 illustrates a configuration of a manufacturing system including seven-degree-of-freedom manipulators.

A description will be given of an example in which manipulators according to the first or second embodiment are used as welding robots. FIG. 4 is a perspective view of a manufacturing system 1 which is performing a welding operation. In the manufacturing system 1, a first welding robot 5 and a second welding robot 6 are disposed on a first positioner 7 and a second positioner 8, respectively. Welding torches 51 and 61 are attached to respective ends of the first welding robot 5 and the second welding robot 6. With this configuration, predetermined portions of a work object 100 are welded.

The first positioner 7 and the second positioner 8 rotate about an axis along the length of the work object 100. As illustrated in FIG. 4, the first welding robot 5 and the second welding robot 6 are configured such that they can approach the work object 100 from above and perform welding even at positions near their chests. The first welding robot 5 and the second welding robot 6 operate in harmony with the first positioner 7 and the second positioner 8. For welding on the back surface of the work object 100, the first positioner 7 and the second positioner 8 rotate together such that portions to be welded are turned toward the first welding robot 5 and the second welding robot 6.

What is claimed is:

1. A manipulator system comprising:
a shoulder joint having a first axis, a second axis, and a third axis;
a wrist joint having a fifth axis, a sixth axis, and a seventh axis;
an elbow joint having a fourth axis;
an upper-arm link connected to the shoulder joint and the elbow joint;
a lower-arm link connected to the elbow joint and the wrist joint;
a shoulder reference point defining an intersection of the first axis of the shoulder joint and a straight line orthogonal to the first and second axes of the shoulder joint;
a wrist reference point a point at which the three axes of the wrist joint intersect;
an elbow reference point defining a coordinate origin of the fourth axis of the elbow joint; and
a command generating unit configured to:
calculate a temporary elbow position from a desired wrist reference point position and a desired elbow rotation angle based on the assumption that a distance between the shoulder reference point and the elbow reference point is fixed;
calculate temporary angles of at least the first and second axes from the temporary elbow position;
calculate an evaluation value using an evaluation function from the temporary angles; and
correct the temporary angles so that the evaluation value reaches a predetermined level, wherein the evaluation value is calculated using the evaluation function from the corrected temporary angles, and wherein the temporary angles are repeatedly corrected until the evaluation value from latest temporary angles reaches the predetermined level,
wherein in a process of correcting the temporary angles, correction angles for the first to fourth axes are calculated using a Jacobian matrix representing a micro-displacement relation between each of the temporary angles of the first to fourth axes and the wrist reference point position and between each of the temporary an les of the first to fourth axes and the elbow rotation angle.

2. The manipulator system according to claim 1, wherein as the evaluation function for correcting the temporary angles, a difference between the desired wrist reference point position and a wrist reference point position calculated from the temporary angles, and a difference between the desired elbow rotation angle and an elbow rotation angle calculated from the temporary angles are used.

3. A manipulator system comprising:
a shoulder joint having a first axis, a second axis, and a third axis;
a wrist joint having a fifth axis, a sixth axis, and a seventh axis;
an elbow joint having a fourth axis;
an upper-arm link connected to the shoulder joint and the elbow joint;
a lower-arm link connected to the elbow joint and the wrist joint;
a shoulder reference point defining an intersection of the first axis of the shoulder joint and a straight line orthogonal to the first and second axes of the shoulder joint;
a wrist reference point a point at which the three axes of the wrist joint intersect;
an elbow reference point defining a coordinate origin of the fourth axis of the elbow joint; and
a command generating unit configured to:
calculate a temporary elbow position from a desired wrist reference point position and a desired elbow rotation angle based on the assumption that a distance between the shoulder reference point and the elbow reference point is fixed;
calculate temporary angles of at least the first and second axes from the temporary elbow position;
calculate an evaluation value using an evaluation function from the temporary angles; and
correct the temporary angles so that the evaluation value reaches a predetermined level, wherein the evaluation value is calculated using the evaluation function from the corrected temporary angles, and wherein the temporary angles are repeatedly corrected until the evaluation value from latest temporary angles reaches the predetermined level,
wherein a plane passing through three points, the shoulder reference point, the wrist reference point, and the elbow reference point, is defined as an elbow plane; and
a difference between a direction cosine of an elbow plane calculated from the temporary angles and a direction cosine of a desired elbow plane is used as the evaluation function for correcting the temporary angles.

4. A manipulator system comprising:
a shoulder joint having a first axis, a second axis, and a third axis;
a wrist joint having a fifth axis, a sixth axis, and a seventh axis;

an elbow joint having a fourth axis;
an upper-arm link connected to the shoulder joint and the elbow joint;
a lower-arm link connected to the elbow joint and the wrist joint;
a command generating unit configured to:
- calculate temporary angles of at least the first and second axes;
- calculate an evaluation value using an evaluation function from the temporary angles;
- correct the temporary angles in accordance with the evaluation value, wherein the evaluation value is calculated using the evaluation function from the corrected temporary angles, and wherein the temporary angles are repeatedly corrected until the evaluation value from latest temporary angles reaches to a predetermined level; and a controller configured to control the shoulder joint, the elbow joint, and the wrist joint using the latest temporary angles corrected by the temporary angle corrector to manipulate a work object, wherein in a process of correcting the temporary angles, correction angles for the first to fourth axes are calculated using a Jacobian matrix representing a micro-displacement relation between each of the temporary angles of the first to fourth axes and a wrist reference point position defined as a point at which the three axes of the wrist joint intersect, and between each of the temporary angles of the first to fourth axes and an elbow rotation angle.

5. The manipulator system according to claim 4, wherein the first axis of the shoulder joint is offset from the second axis of the shoulder joint by a distance along a straight line orthogonal to the first and second axes of the shoulder joint.

6. A manipulator system comprising:
a shoulder joint having a first axis, a second axis, and a third axis;
a wrist joint having a fifth axis, a sixth axis, and a seventh axis;
an elbow joint having a fourth axis;
an upper-arm link connected to the shoulder joint and the elbow joint;
a lower-arm link connected to the elbow joint and the wrist joint;
a shoulder reference point defining an intersection of the first axis of the shoulder joint and a straight line orthogonal to the first and second axes of the shoulder joint;
a wrist reference point a point at which the three axes of the wrist joint intersect;
an elbow reference point defining a coordinate origin of the fourth axis of the elbow joint;
a command generating unit configured to:
- calculate temporary angles of at least the first and second axes;
- calculate an evaluation value using an evaluation function from the temporary angles;
- correct the temporary angles in accordance with the evaluation value, wherein the evaluation value is calculated using the evaluation function from the corrected temporary angles, and wherein the temporary angles are repeatedly corrected until the evaluation value from latest temporary angles reaches to a predetermined level; and a controller configured to control the shoulder joint, the elbow joint, and the wrist joint using the latest temporary angles corrected by the temporary angle corrector to manipulate a work object, wherein a plane passing through three points, the shoulder reference point, the wrist reference point, and the elbow reference point, is defined as an elbow plane; and a difference between a direction cosine of an elbow plane calculated from the temporary angles and a direction cosine of a desired elbow plane is used as the evaluation function for correcting the temporary angles.

* * * * *